United States Patent
Lee et al.

(10) Patent No.: US 12,411,603 B2
(45) Date of Patent: Sep. 9, 2025

(54) MEMORY DEVICE AND OPERATING METHOD THEREOF

(71) Applicant: SK hynix Inc., Icheon-si (KR)

(72) Inventors: Jae Young Lee, Icheon-si (KR); Han Bin Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 111 days.

(21) Appl. No.: 18/451,020

(22) Filed: Aug. 16, 2023

(65) Prior Publication Data

US 2024/0289014 A1  Aug. 29, 2024

(30) Foreign Application Priority Data

Feb. 28, 2023 (KR) .......... 10-2023-0026926

(51) Int. Cl.
*G06F 3/06* (2006.01)

(52) U.S. Cl.
CPC .......... *G06F 3/0608* (2013.01); *G06F 3/0619* (2013.01); *G06F 3/0659* (2013.01); *G06F 3/0673* (2013.01)

(58) Field of Classification Search
CPC .... G06F 3/0608; G06F 3/0619; G06F 3/0659; G06F 3/0673; G06F 17/30339
See application file for complete search history.

(56) References Cited

U.S. PATENT DOCUMENTS

| | | | |
|---|---|---|---|
| 2016/0004740 A1* | 1/2016 | Bendel | G06F 16/23 707/737 |
| 2017/0123662 A1 | 5/2017 | Sharon et al. | |
| 2017/0255402 A1 | 9/2017 | Narasimha et al. | |
| 2022/0159207 A1 | 5/2022 | Dell' et al. | |
| 2022/0269601 A1 | 8/2022 | Monteith | |
| 2022/0342554 A1 | 10/2022 | Chen et al. | |
| 2023/0030668 A1 | 2/2023 | Sohn | |
| 2023/0031951 A1 | 2/2023 | Sohn | |
| 2023/0132037 A1 | 4/2023 | Mizushima et al. | |
| 2023/0195311 A1 | 6/2023 | Cooper et al. | |

FOREIGN PATENT DOCUMENTS

| | | |
|---|---|---|
| KR | 1020080022628 A | 3/2008 |
| KR | 1020080046345 A | 5/2008 |
| KR | 1020120098094 A | 9/2012 |
| KR | 1020210092302 A | 7/2021 |

OTHER PUBLICATIONS

U.S. Appl. No. 18/451,020, filed Aug. 16, 2023, Jae Young Lee.

* cited by examiner

*Primary Examiner* — Joseph J Lauture
(74) *Attorney, Agent, or Firm* — WILLIAM PARK & ASSOCIATES LTD.

(57) ABSTRACT

A memory device may include: a plurality of memory cells; a data manager for receiving data from the plurality of memory cells, and generating sub-data groups having a predetermined size, based on the received data; and a data compressor for detecting first-value bits having a first logic value among the bits in the received data, determining a number of target bits corresponding to each of the sub-data groups among the first-value bits to become 1 or less per sub-data group, and generating a plurality of compressed-data chunks including a logic value of the target bits and position information representing a position of the target bits in the data.

18 Claims, 7 Drawing Sheets

MEMORY DEVICE AND OPERATING METHOD THEREOF

CROSS-REFERENCE TO RELATED APPLICATION

The present application claims priority under 35 U.S.C. § 119 (a) to Korean patent application number 10-2023-0026926 filed on Feb. 28, 2023, in the Korean Intellectual Property Office, the entire disclosure of which is incorporated by reference herein.

BACKGROUND

1. Technical Field

The present disclosure generally relates to a memory device, and an operating method thereof.

2. Related Art

A storage device is a device which stores data under the control of a host device such as a computer or a smart phone. The storage device may include a memory device for storing data and a memory controller for controlling the memory device. A memory device can be classified as either a volatile memory device or a nonvolatile memory device.

A volatile memory device is a memory device in which data is stored and retained only when power is supplied. Stored data disappears when the supply of power is interrupted. A volatile memory device may include a Static Random Access Memory (SRAM), a Dynamic Random Access Memory (DRAM), and the like.

A nonvolatile memory device is a memory device in which stored data does not disappear even when the supply of power is interrupted. A nonvolatile memory device may include a Read Only Memory (ROM), a Programmable ROM (PROM), an Electrically Programmable ROM (EPROM), an Electrically Erasable ROM (EEROM), a flash memory, and the like.

Data read from a memory device may be moved or transferred through an input/output channel of the memory device or an input/output channel of the storage device. When an amount of data read from a memory device is greater than an amount of data that can be transferred through an input/output channel, the memory device may compress the read data to reduce the amount of data that must be transferred through the input/output channel. A compression circuit for data compression may be additionally included in the memory device. The number and physical size of the circuits that comprise compression circuit may need to be limited in the memory device. A memory device that has a reduced-size compression circuit and a method of operating a reduced-size compression circuit would be an improvement over the prior art.

SUMMARY

Embodiments disclosed herein provide a memory device and a data compression method, in which the physical area of the circuitry that compresses data is reduced.

In accordance with an aspect of the present disclosure, there is provided a memory device comprising: a plurality of memory cells; a data manager configured to receive data from the plurality of memory cells, and additionally configured to generate sub-data groups having a predetermined size, based on the received data. The disclosed memory device also comprises a data compressor, which is configured to detect first-value bits in the received data, which have a predetermined first logic value. Such bits are hereafter referred to "first-value bits" in the bits that comprise the received data. The data compressor is also configured to determine a number of "target bits" corresponding to each of the sub-data groups among the first-value bits to become 1 or less per sub-data group, and generate a plurality of compressed-data chunks, each data chunk comprising the logic value of the target bits and position information representing a position of the target bits in the received data.

In accordance with another aspect of the present disclosure, there is also provided a storage device comprising: a memory device configured to divide data read from a plurality of memory cells into sub-data groups, detect target groups having a first-value bit having a predetermined first logic value. The memory device is also configured to determine target bits in the data and generate compressed-data chunks, each data chunk comprising a logic value of the target bits and position information representing a position or location of the target bits in the read data. A memory controller comprising the storage device is configured to recover the read data by decoding the plurality of compressed-data chunks received from the memory device.

In accordance with still another aspect of the present disclosure, there is provided a method of operating a memory device, the method including: generating sub-data groups having a predetermined size, based on data received from a plurality of memory cells; detecting first-value bits in the received data, the first-value bits having a predetermined first logic value; determining a number of target bits corresponding to each of the sub-data groups having a first-value bit; and generating a plurality of compressed-data chunks including a logic value of the target bits and position information representing a position of the target bits in the data.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
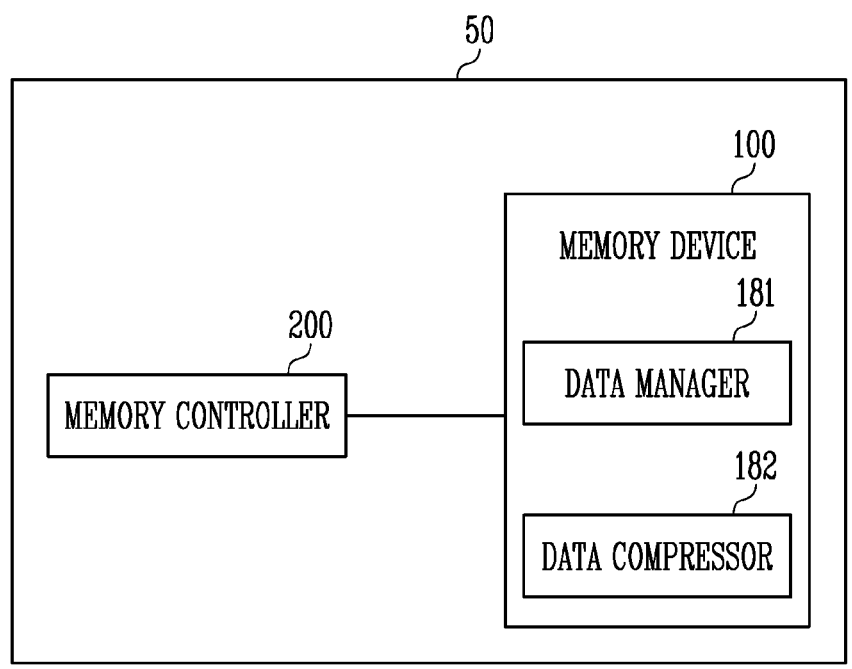
FIG. 1 is a diagram illustrating a storage device including a memory device in accordance with an embodiment of the present disclosure.

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein. FIG. 1 is a diagram illustrating a storage device including a memory device in accordance with an embodiment of the present disclosure. The storage device 50 may include a memory device 100 and a memory controller 200 for controlling an operation of the memory device 100. The storage device 50 may be a device for storing data under the control of a host, nor shown, examples of which include a mobile phone, a smart phone, an MP3 player, various types of computers, a game console, a TV, or an in-vehicle infotainment system.

Figure 6:
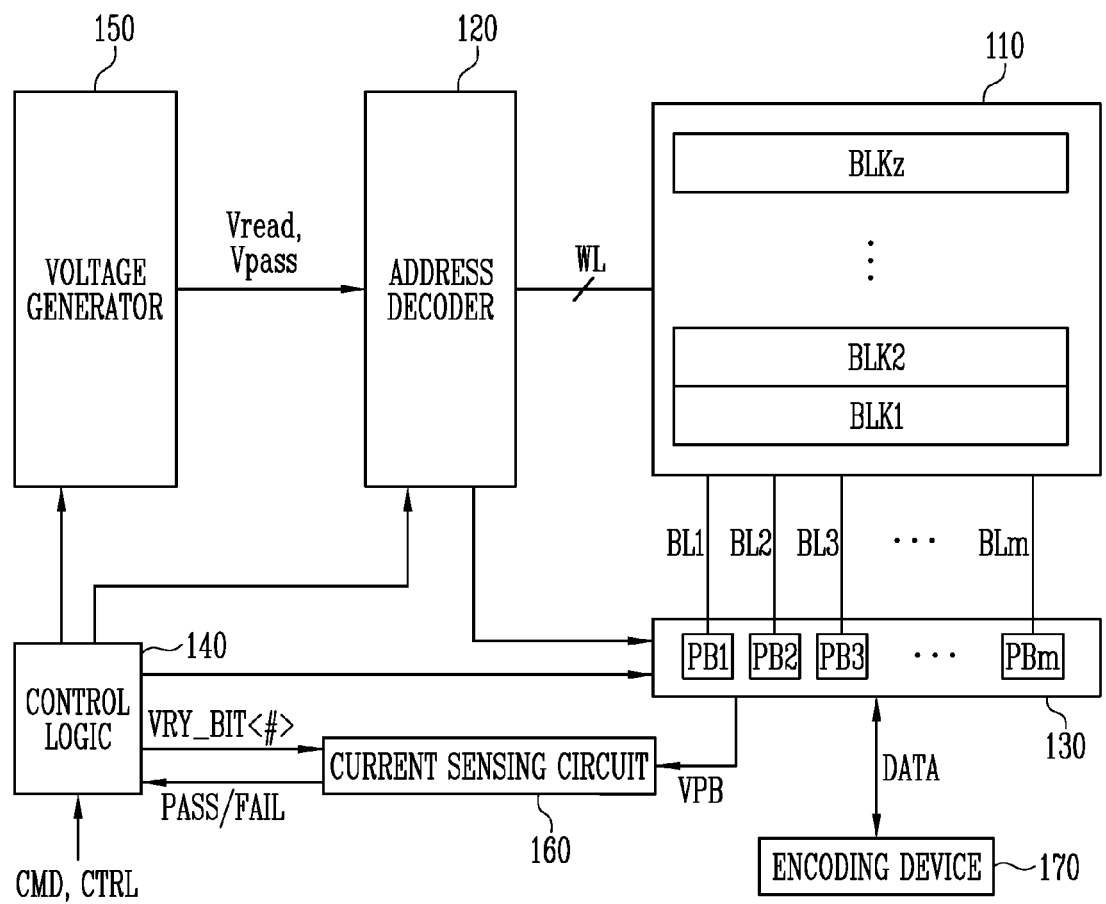
FIG. 6 is a diagram illustrating the memory device shown in FIG. 1.

The memory device 100 may store data under the control of the memory controller 200. The memory device 100 may include a memory cell array including a plurality of memory cells for storing data. FIG. 6, described below, depicts a memory device and its associated memory cells.

The memory device 100 may receive a command and one or more addresses from the memory controller 200, and access an area of the memory device where data is stored, the pertinent area of the memory device 100 being determined by the address or addresses of one or more memory cells in the memory cell array. The memory device 100 may perform operations on the contents of one or more memory cells, at a corresponding address or addresses, as required by a particular command sent to the memory device 100 by the memory controller 200.

The memory controller 200 may control operations of the storage device 50. The memory controller 200 may cause the memory device 100 to perform a program operation, a read operation, an erase operation, or the like, responsive to requests sent to the memory controller 200 by a host, not shown.

In an embodiment of the present disclosure, the storage device 50 may include a memory device 100 which outputs compressed data, which is obtained by compressing data read from memory device. The memory device 100 may also include a memory controller 200, which recovers the original read data from the compressed data. The read data, i.e., data read from the memory device 100, may be stored in a plurality of memory cells, such as the memory cells depicted in FIG. 6 or equivalents thereof.

The memory device 100 may include a data manager 181 and a data compressor 182. The memory device 100 may output compressed-data chunks obtained by compressing data read from a plurality of memory cells.

The data manager 181 may receive original data from the plurality of memory cells. The data manager 181 may generate sub-data groups, each sub-data group having a predetermined size, which may be based on or determined by the number of bits, i.e., the size, comprising the original data received from memory cells. The data manager 181 may determine a size of the sub-data group, based on the number of bits received from memory cells during one read cycle. A particular number of data bits received from memory cells during a read cycle, is also referred to herein as a size of the data received from memory cells.

The data compressor 182 may detect first-value bits, in the original data. In an embodiment of the present disclosure, the first logic value may be logic 1. In an alternate embodiment, the first logic value may be logic zero.

The data compressor 182 may determine a number of "target bits" in a sub-data group, which have a first-value bit, i.e., a bit having the first value logic 1. When a plurality of first-value bits are included in a sub-data group, the data compressor 182 may select one first-value bit and determine the selected first-value bit as one of the "target bits" and ignore other, subsequently-received first-value bits.

The data compressor 182 may generate a plurality of compressed-data "chunks," each chunk comprised of "target bits" and position-information bits, which specify the position or location of the target bits in the original data read from the memory cells during a read cycle. The data compressor 182 may output a plurality of compressed-data chunks in response to a data output command received by the memory device 100 from the memory controller 200.

The memory controller 200 may receive a plurality of compressed-data chunks from the memory device 100. The memory controller 200 may recover original data from data chunks, based on data chunk bits having the first logic value and the position of those first-value bits in the original data, both of which are information included in the data chunks.

The memory controller 200 may generate decoding data, from the compressed-data chunks. The memory controller 200 may perform an error correction operation on the decoding data. The memory controller 200 may recover first-value bits that were discarded in generation of a compressed-data chunk by performing the error correction operation.

In an embodiment of the present disclosure, the number of compressed-data chunks which can be generated per sub-data group may be a minimum of 1. No compressed-data chunk may be generated from a sub-data group that does not have at least one "target bit." Since the number of compressed-data chunks generated per sub-data group is limited, the physical area of a compression circuit, which generates compressed-data chunks, can be reduced.

In an embodiment of the present disclosure, the original data may be soft data. Bits included in the soft data may have a logic value of 0 or 1. The soft data may be data that rarely includes logic value 1. A ratio at which first-value bits, i.e., bits in the original data that are logic 1, are included in the soft data may be less than a ratio at which bits having logic value of 0 are included in the same soft data. Since the ratio of the first-value bits is small, a probability that a plurality of first-value bits will be included in the same sub-data group may be very low. And, since the ratio of the first-value bits is small, an error rate of compressed-data chunks generated from first-value bits, may be very low. Since the compressed-data chunk error rate is low, a probability that the original data will be recovered from compressed-data chunks by the error correction operation may be high.

Figure 2:
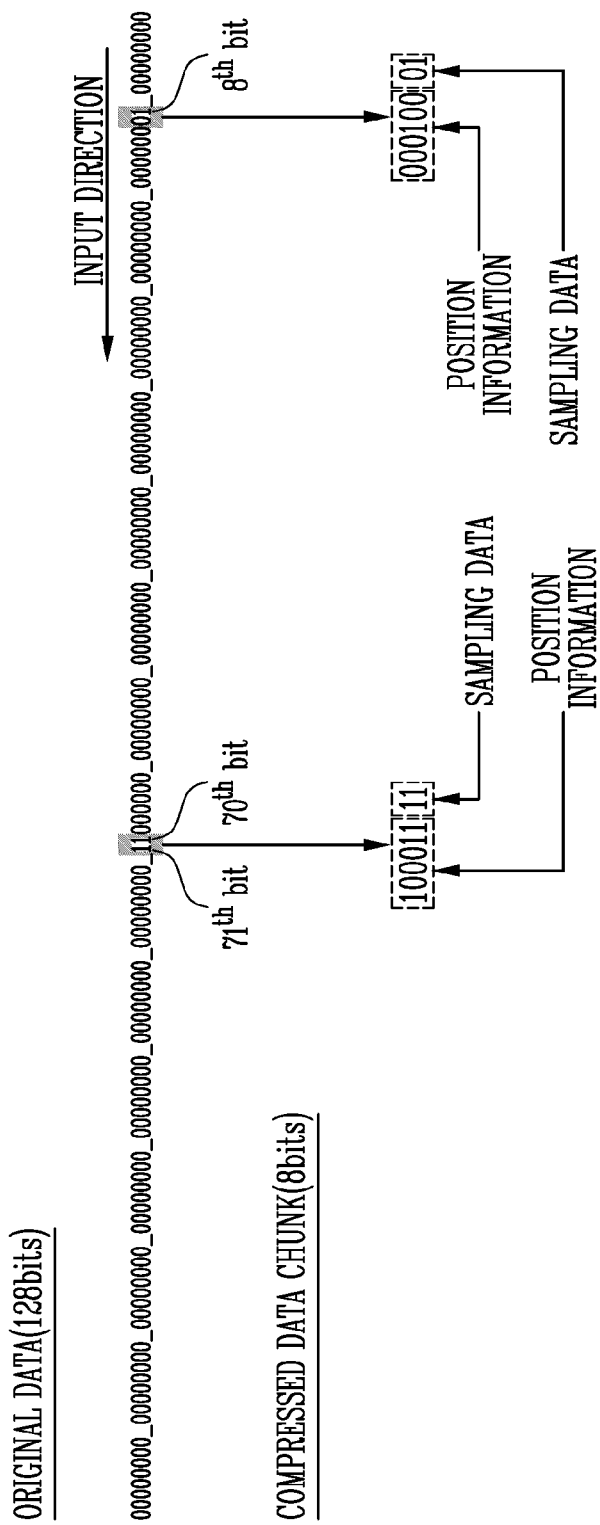
FIG. 2 is a diagram illustrating a method of generating compressed-data chunks, based on position information of target data and a logic value.

FIG. 2 is a diagram illustrating a method of generating compressed-data chunks, based on position information of target data and a logic value.

FIG. 2 shows that compressed-data chunks may be generated as the 128 bits of original data is encoded. For convenience of description, it may be assumed that the original data has a size of 128 bits and one compressed-data chunk has 8 bits.

The original 128 bits of data may be sampled two bits at a time, i.e., using 2 bits as a target data unit. The value of the upper 6 bits of an 8-bit compressed-data chunk, may be the position or location of a two-bit target data unit, at least one of which is a first-value bit, i.e., having the aforementioned first logic value. The lower 2 bits of the compressed-data-chunk may represent bits in the data chunk having the first logic value of logic 1.

In FIG. 2, along a right-to-left, data input direction, the eighth ($8^{th}$) bit, the seventieth ($70^{th}$) bit, and the seventy-first ($71^{st}$) bit are first-value bits, i.e., bits having a logic 1 value. In the same right-to-left, data input direction, the first, two-bit group of bits (two sampling bits) of the original 128 bits of data having a first-value bit, i.e., a bit that is a logic 1, is located at the fourth, two-bit "position" of the two bits of sampling data from the 128-bit original data. A second bit group having a first-value bit is located at the thirty-fifth, two-bit "position" of the 128-bit original data.

Since the upper 6 bits of the 8 bits of a compressed-data chunk identify the location of a two-bit data unit in the 128-bit original data having a first-value bit, in FIG. 2, the upper 6 bits of the first compressed-data chunk is "000100," the decimal value of which is four. Since the lower 2 bits of the 8 bit of a compressed-data chunk are "sampling data," in FIG. 2, the lower 2 bits of the first compressed-data chunk is "01." The "value" of the 8-bit first compressed-data chunk corresponding to the first bit group is thus 00010001, the decimal value of which is seventeen. Similarly, the value of the second compressed-data chunk corresponding to the second bit group may be 10001111. In this specification, the value of the compressed-data chunk may be expressed with binary numbers.

As shown in FIG. 2, an eight-bit compressed-data chunk provides position information using 6 bits. Two bits are compressed-data chunk sampling data. However, this is merely an exemplar of one embodiment. The size of the compressed-data chunk, the number of bits that provide position information, and the number of bits that provide sampling data may vary.

Figure 3:
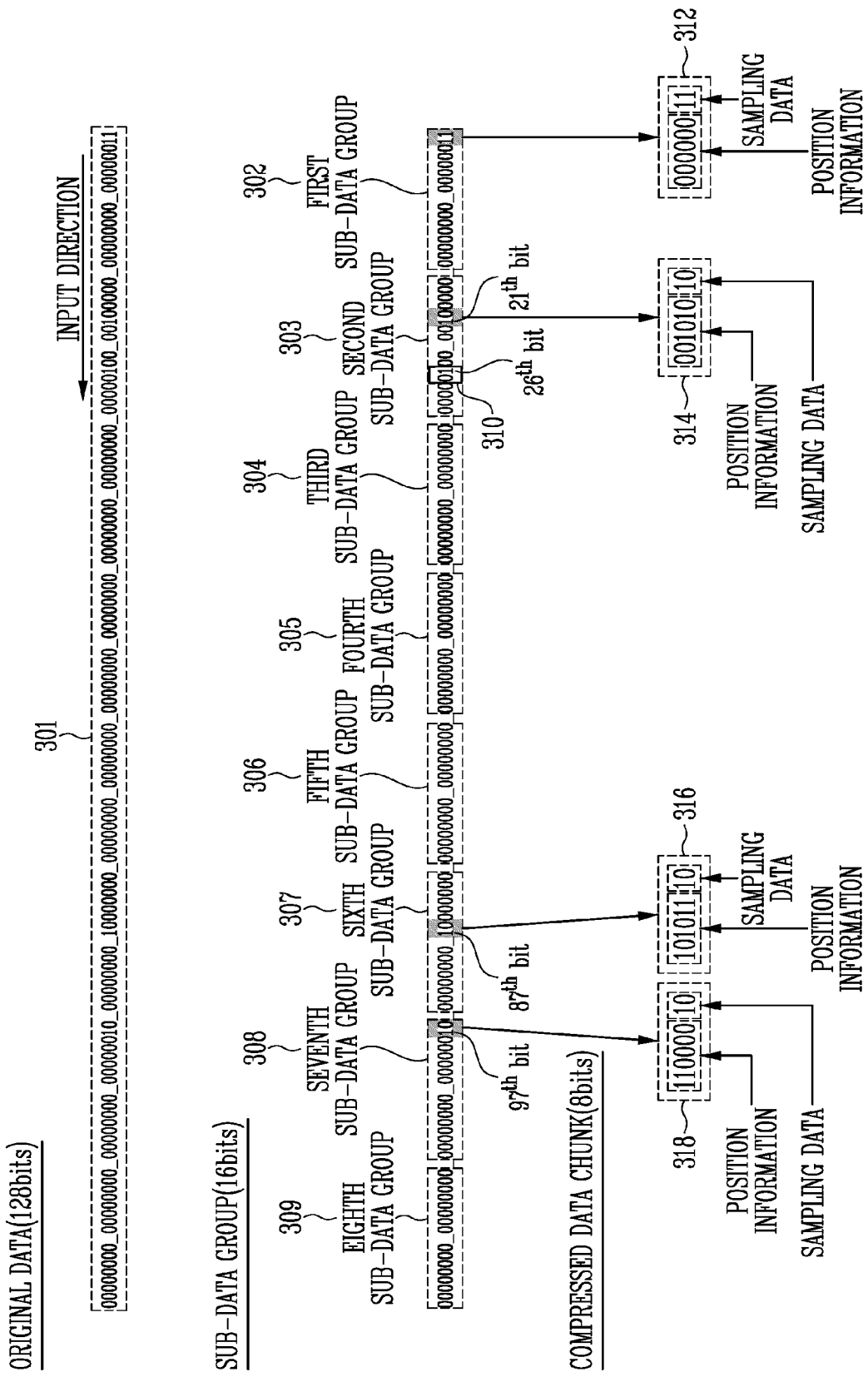
FIG. 3 is a diagram illustrating a method of generating compressed-data chunks in accordance with an embodiment of the present disclosure.

FIG. 3 is a diagram illustrating a method of generating compressed-data chunks in accordance with an embodiment of the present disclosure.

Referring to FIG. 3, as 128 bits of original data 301 is encoded, a plurality of compressed-data chunks may be generated. The original data 301 may be divided into sub-data groups, 302-309. The maximum number of compressed-data chunks 312, 314, 316 and 318, which can be generated per sub-data group 302-309 may be limited. A second bit 310, which is not used in generation of the compressed-data chunk 314 among first-value bits may be discarded. FIG. 3 may be described together with the components shown in FIG. 1.

For convenience of description, it may be assumed that the original data 301 is 128 bits of data, which are received during one read cycle. The original, 128 bits of data has sub-data groups of 16 bits each, and a compression ratio is ¼. Accordingly, the number of the sub-data groups may be 8, and the size of the compressed-data chunks may be 8 bits.

In FIG. 3, along the same right-to-left data input direction, a zeroth bit, i.e., the bit at the zeroth location, a first bit, a twenty-first bit, a twenty-sixth bit, an eighty-seventh bit, and a ninety-seventh bit, are included in the original data 301, and may be first-value bits, i.e., bits having a logic 1 value. Only a first sub-data group 302, a second sub-data group 303, a sixth sub-data group 307, and a seventh sub-data group 308 among the eight sub-data groups have a first-value bit. And the first-value bit is not included other sub-data groups. In this specification and as stated above two (2) bits may form one bit group, and a target bit may be one of bit groups each including two bits.

The data manager 181 may generate sub-data groups by dividing original data received from a plurality of memory cells. The data manager 181 may sequentially generate first to eighth sub-data groups, based on an order of the original data received from the plurality of memory cells.

The data manager 181 may determine a size of the sub-data groups, based on a size of the original data. i.e., the number of bits, received during one read cycle. In an embodiment of the present disclosure, since the size of data received during one cycle is 16 bits, the size of the sub-data groups may be 16 bits. The eight sub-data groups may have the same size.

The data compressor 182 may detect first-value bits in the original data. In original data depicted in FIG. 3, the data compressor 182 may detect, as first-value bits, the zeroth bit, the first bit, the twenty-first bit, the twenty-sixth bit, the eighty-seventh bit, and the ninety-seventh bit. The data compressor 182 may determine target bits corresponding to each of the sub-data groups among the first bits. For example, the data compressor 182 may determine, as target bits, bits of the zeroth bit group comprising both the zeroth bit and the first-value bit.

The data compressor 182 may determine the number of the target bits to become 1 or less per sub-data group. The data compressor 182 may select only one first-value bit group from a sub-data group including a plurality of first-value bits. The data compressor 182 may determine, as one of the target bits, a first-value bit which is detected first of all from each of the sub-data groups. The data compressor 182 may discard a bit which is detected later than a target bit among first-value bits included in the same sub-data group.

For example, the data compressor 182 may determine, as a target bit, a tenth bit group including a twentieth bit and the twenty-first bit in the second sub-data group. Although a thirteenth bit group including the twenty-sixth bit and a twenty-seventh bit includes a first-value bit, the thirteenth bit group is not used in generation of the compressed-data chunk, but may be discarded. In an embodiment of the present disclosure, the thirteenth bit group may be the second bit 310 which is not used in the generation of the compressed-data chunk.

The data compressor 182 may determine a number of target bits, based on a predetermined compression ratio. The data compressor 182 may select target bits among first-value bits, corresponding to the determined number. For example, since the original data is 128 bits and each of the compressed-data chunk has 8 bits, the number of target bits corresponding to the compression ratio may be 4. The data compressor 182 may select, as target bits, four-bit groups among five-bit groups having a first-value bit. The unselected bit group may be discarded.

In another embodiment of the present disclosure, the data compressor 182 may detect a maximum of one first-value bit per sub-data group. When a first-value bit is detected for each of the sub-data groups, the data compressor 182 may suspend a detection operation, and determine the detected first-value bit as a target bit. For example, the data compressor 182 may determine, as a target bit, the tenth bit group detected in the second sub-data group, and suspend the detection operation. The data compressor 182 does not detect the thirteenth bit group but may discard the thirteenth bit group. As the detection operation is suspended, the generation time of the compressed-data chunks can be reduced.

In FIG. 3, the data compressor 182 may determine, as target bits, the zeroth bit group, the tenth bit group, a forty-third bit group, and a forty-eighth bit group. The data compressor 182 may generate a plurality of compressed-data chunks, based on the target bits.

The data compressor 182 may generate a plurality of compressed-data chunks including a logic value of target bits and position information representing a position of the target bits in the original data. The data compressor 182 may generate a compressed-data chunk 00000011, generate a compressed-data chunk 00101010 corresponding to the second sub-data group, generate a compressed-data chunk 10101110 corresponding to the sixth sub-data group, and generate a compressed-data chunk 11000010 corresponding to the seventh sub-data group. The method in which the data compressor 182 generates the compressed-data chunks may correspond to the description shown in FIG. 2.

The memory controller 200 may recovery the original data, based on the plurality of compressed-data chunks. The memory controller 200 may generate decoding data by performing a decoding operation, based on the plurality of compressed-data chunks. Since the discarded second bit 310 may exist in the generation of the plurality of compressed-data chunks, the decoding data may be different from the original data.

The memory controller 200 may perform an error correction operation on the decoding data. In an embodiment of the present disclosure, in the original data, a rate of discarded second bits may be very small or 0. Thus, the decoding data can be recovered to the original data through the performed error correction operation.

Figure 4:
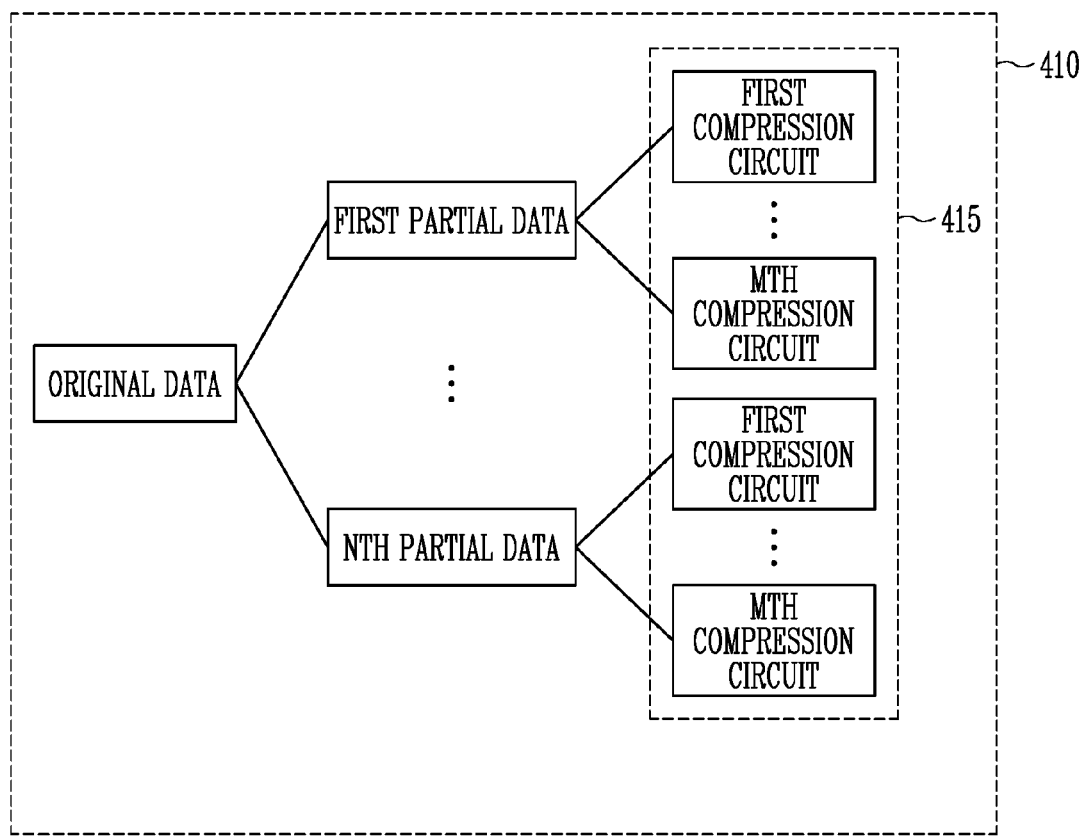
FIG. 4 is a diagram illustrating a compression circuit for generating compressed-data chunks in accordance with an embodiment of the present disclosure.
Figure 4:
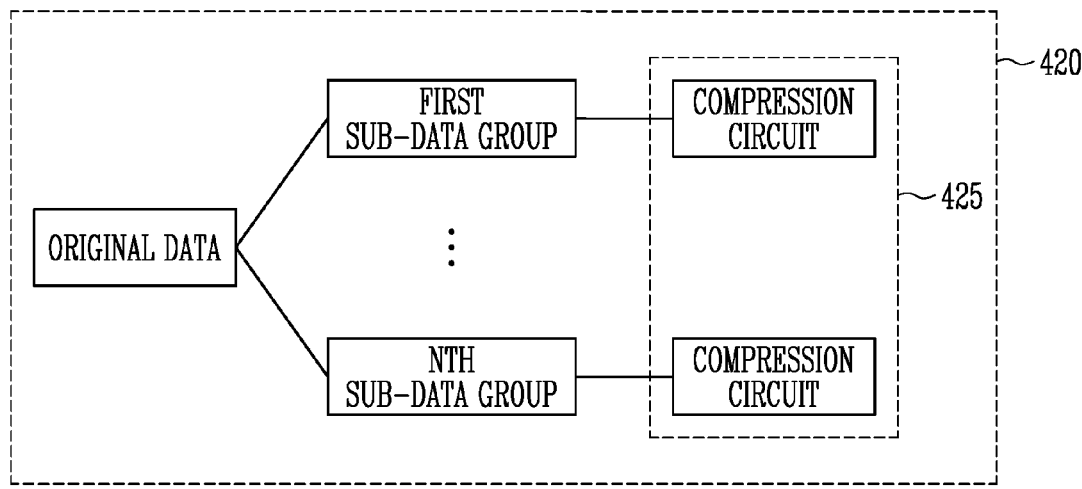

FIG. 4 is a diagram illustrating a compression circuit for generating compressed-data chunks in accordance with an embodiment of the present disclosure.

Referring to FIG. 4, the area of a semiconductor device having a compression circuit for generating compressed-data chunks may be illustrated. In that regard, reference numeral 410 identifies a compression circuit whereby a maximum of M compressed-data chunks per one partial data are generated. Reference numeral 420 identifies a compression circuit whereby a maximum of one compressed-data chunk per sub-data group is generated in accordance with the embodiment of the present disclosure.

In the compression circuit embodiment identified by reference numeral 410, original data may be divided into N partial data. In the compression circuit embodiment identified by reference numeral 420, original data may be divided into N sub-data groups. In the "410" embodiment, M compression circuits are included per one partial data. The number of compression circuits 415 may therefore be N*M. In the "420" embodiment, one compression circuit is included per one sub-data group. Therefore, the 420 embodiment the number of required compression circuits 425 is much smaller and may be N instead of N*M required by the "410" embodiment. Since a compression circuit in each embodiment will have the same size, the total area of the compression circuits in accordance with the embodiment of the present disclosure may be decreased by a factor of "M" due to the fact that M-fewer compression circuits are required by the "420" embodiment.

In an embodiment of the present disclosure, the compressed original data may be soft data. A ratio of first-value bits in original data having a first logic value, may be 1 to 2% as compared with all bits included in the original data. Therefore, a difference between the number of compressed-data chunks generated in accordance with the embodiment of the present disclosure as shown in the case of the "420" embodiment and the number of compressed-data chunks generated according to the "410" embodiment is essentially zero. Even if a non-zero difference exists, decoding data in a decoding process can be recovered to the original data through an error correction operation.

Figure 5:
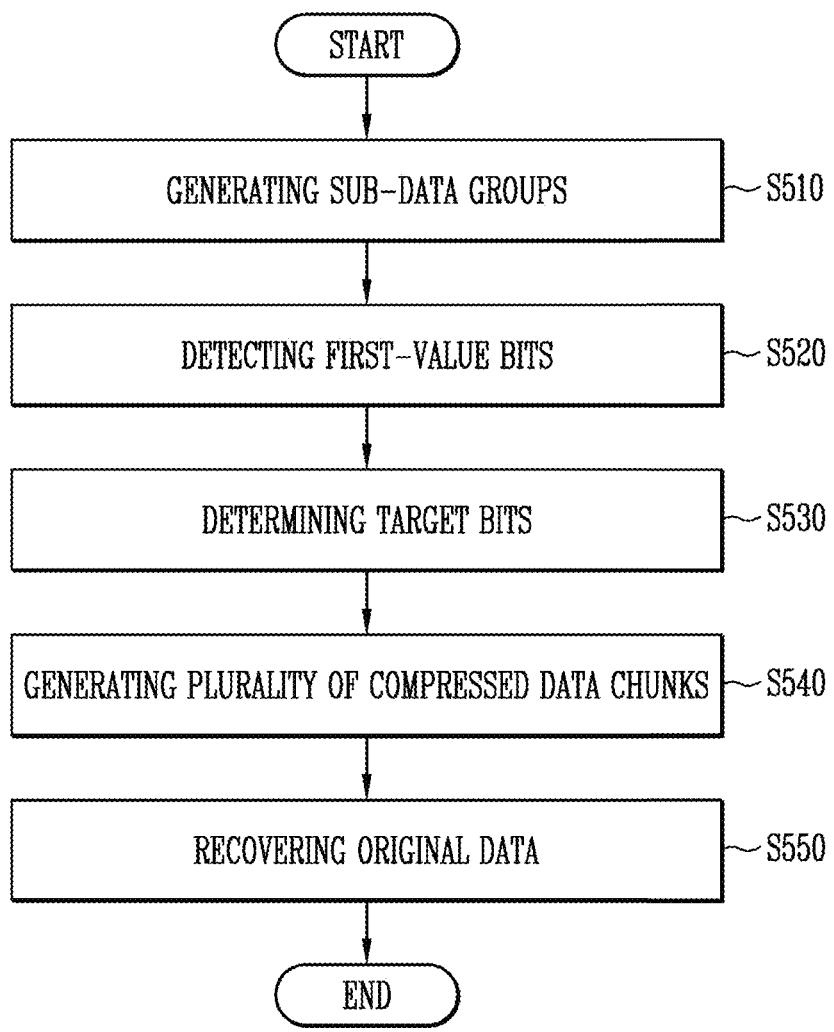
FIG. 5 is a flowchart illustrating an operating method of the storage device in accordance with an embodiment of the present disclosure.

FIG. 5 is a flowchart illustrating an operating method of the storage device in accordance with an embodiment of the present disclosure.

Referring to FIG. 5, the storage device may generate compressed-data chunks, based on original data stored in a plurality of memory cells and, recover the original data, based on the generated compressed-data chunks. The storage device may compress the original data, thereby storing or moving the compressed data. The storage device may decode the compressed-data chunks, thereby recovering the decoded compressed-data chunks to the original data. FIG. 5 may be described together with the components shown in FIG. 1.

In step S510, the data manager 181 may generate sub-data groups having a predetermined size, based on original data received from a plurality of memory cells. The method in which the data manager 181 generates the sub-data groups may correspond to the descriptions shown in FIGS. 1 and 3.

In step S520, the data compressor 182 may detect first-value bits having a first logic value among the bits that comprise the original data. In step S530, the data compressor 182 may determine a number of target bits corresponding to each of the sub-data groups among the first-value bits to be 1 or less per sub-data group. The method in which the data compressor 182 detects the first-value bits and determines the target bits may correspond to the descriptions shown in FIGS. 1 and 3.

In step S540, the data compressor 182 may generate a plurality of compressed-data chunks, which comprise a logic value of the target bits and position information representing or identifying a position of the target bits in the original data. The method in which the data compressor 182 generates the plurality of compressed-data chunks may correspond to the description shown in FIG. 2.

In step S550, the memory controller 200 may recover the original data, based on the plurality of compressed-data chunks received thereby. The memory controller 200 may generate decoding data by performing a decoding operation, based on the plurality of compressed-data chunks. The memory controller 200 may recover the original data by performing an error correction operation on the decoding data. Second bits discarded in the process of generating the plurality of compressed-data chunks may be recovered through the error correction operation.

FIG. 6 is a diagram illustrating the memory device shown in FIG. 1.

Referring to FIG. 6, the memory device 100 may include a memory cell array 110, an address decoder 120, a page buffer group 130, a control logic 140, a voltage generator 150, a current sensing circuit 160, and an encoding device 170. The address decoder 120, the page buffer group 130, the voltage generator 150, and the current sensing circuit 160 may be referred to as a peripheral circuit which the control logic 140 controls. FIG. 6 may be described together with the components shown in FIG. 1.

The memory cell array 110 may include a plurality of memory blocks BLK1 to BLKz. The plurality of memory blocks BLK1 to BLKz may be connected to the address decoder 120 through word lines WL. The plurality of memory blocks BLK1 to BLKz may be connected to the page buffer group 130 through bit lines BL1 to BLm. Each of the plurality of memory blocks BLK1 to BLKz may include a plurality of memory cells. In an embodiment, each memory cell of the plurality of memory cells may be a nonvolatile memory cell having a vertical channel structure. The memory cell array 110 may be configured as a memory cell array having a two-dimensional structure or a three-dimensional structure. In some embodiments, the memory cell array 110 may be configured as a memory cell array having a three-dimensional structure. Meanwhile, each of the plurality of memory cells included in the memory cell array 110 may store at least one-bit data. In an embodiment, each of plurality of the memory cells included in the memory cell array 110 may be a single-level cell (SLC) storing one-bit data. In another embodiment, each of the plurality of memory cells included in the memory cell array 110 may be a multi-level cell (MLC) storing two-bit data. In still another embodiment, each of the plurality of memory cells included in the memory cell array 110 may be a triple-level cell (TLC) storing three-bit data. In still another embodiment, each of the plurality of memory cells included in the memory cell array 110 may be a quadruple-level cell (QLC) storing four-bit data. In some embodiments, the memory cell array 110 may include a plurality of memory cells each storing five-or-more bit data.

The address decoder 120 may be connected to the memory cell array 110 through the word lines WL. The address decoder 120 may be operated under the control of the control logic 140. The address decoder 120 may receive an address through an input/output channel in the memory device 100.

The address decoder 120 may decode a block address in the received address. The address decoder 120 may select at least one memory block according to the decoded block address. Also, in a read voltage application operation during a read operation, the address decoder 120 may apply a read voltage Vread generated by the voltage generator 150 to a selected word line of the selected memory block, and apply a pass voltage Vpass generated by the voltage generator 150 to the other unselected word lines. Also, in a program verify operation, the address decoder 120 may apply a verify voltage generated by the voltage generator 150 to the selected word line of the selected memory block, and apply the pass voltage Vpass to the other unselected word lines.

The address decoder 120 may decode a column address in the received addresses. The address decoder 120 may transmit the decoded column address to the page buffer group 130.

Read and program operations of the memory device 100 may be performed in units of pages. An address received in response to a request for the read and program operations may include a block address, a row address, and a column address. The address decoder 120 may select one memory block and one word line according to the block address and the row address. The column address may be decoded by the address decoder 120 to be provided to the page buffer group 130. In this specification, memory cells connected to one word line may be designated as one "physical page."

The page buffer group 130 may include a plurality of page buffers PB1 to PBm. The page buffer group 130 may be operated as a "read circuit" in a read operation of the memory cell array 110, and be operated as a "write circuit" in a write operation of the memory cell array 110. The plurality of page buffers PB1 to PBm may be connected to the memory cell array 110 through the bit lines BL1 to BLm. In order to sense a threshold voltage of memory cells in a read operation and a program verify operation, the plurality of page buffers PB1 to PBm may sense, through a sensing node, a change in amount of current flowing according to a program state of a corresponding memory cell while continuously supplying a sensing current to bit lines connected to the memory cells, and latch the sensed change as sensing data. The page buffer group 130 may be operated in response to page buffer control signals output from the control logic 140. In this specification, a writing operation of the write circuit may be used as the same meaning as a program operation on selected memory cells.

The page buffer group 130 may temporarily store read data by sensing data of a memory cell in a read operation and then output data DATA to the encoding device 170 of the memory device 100.

In an embodiment of the present disclosure, the encoding device 170 may compress read data read from the memory cell array 110 of the memory device 100. The compressed read data may be output through the input/output channel.

The encoding device 170 may include a data manager 181 and the data compressor 182. The encoding device 170 may divide read data into sub-data groups, and generate a maximum of one compressed-data chunk per sub-data group. As the number of compressed-data chunks which can be generated per sub-data group is limited, the number of compression circuits which generate compressed-data chunks may be decreased. In accordance with the embodiment of the present disclosure, the required area of the encoding device 170 can be minimized while the accuracy of compressed-data chunks is maintained.

The control logic 140 may be connected to the address decoder 120, the page buffer group 130, the voltage generator 150, and the current sensing circuit 160. The control logic 140 may receive a command CMD and a control signal CTRL though the input/output channel of the memory device 100. The control logic 140 may control a general operation of the memory device 100 in response to the control signal CTRL. Also, the control logic 140 may output a control signal for adjusting a sensing node precharge potential level of the plurality of page buffers PB1 to PBm. The control logic 140 may control the page buffer group 130 to perform a read operation of the memory cell array 110.

Meanwhile, the control logic 140 may decide whether a verify operation on a specific target program state has passed or failed in response to a pass signal PASS or a fail signal FAIL, which is received from the current sensing circuit 160.

The voltage generator 150 may generate the read voltage Vread and the pass voltage Vpass in a read operation in response to a control signal output from the control logic 140. In order to generate a plurality of voltages having various voltage levels, the voltage generator 150 may include a plurality of pumping capacitors for receiving an internal power voltage. The voltage generator 150 may generate the plurality of voltages by selectively activating the plurality of pumping capacitors under the control of the control logic 140.

The current sensing circuit 160 may generate a reference current and a reference voltage in response to an allow bit VRY_BIT<#> received from the control logic 140 in a verify operation. The current sensing circuit 160 may output the pass signal PASS or the fail signal FAIL by comparing the generated reference voltage with a sensing voltage VPB received from the page buffers PB1 to PBm included in the page buffer group 130 or by comparing the generated reference current with a sensing current received from the page buffers PB1 to PBm included in the page buffer group 130.

The address decoder 120, the page buffer group 130, the voltage generator 150, and the current sensing circuit 160 may function as a "peripheral circuit" which performs a read operation, a write operation, and an erase operation on the memory cell array 110. The peripheral circuit may perform the read operation, the write operation, and the erase operation on the memory cell array 110 under the control of the control logic 140.

Figure 7:
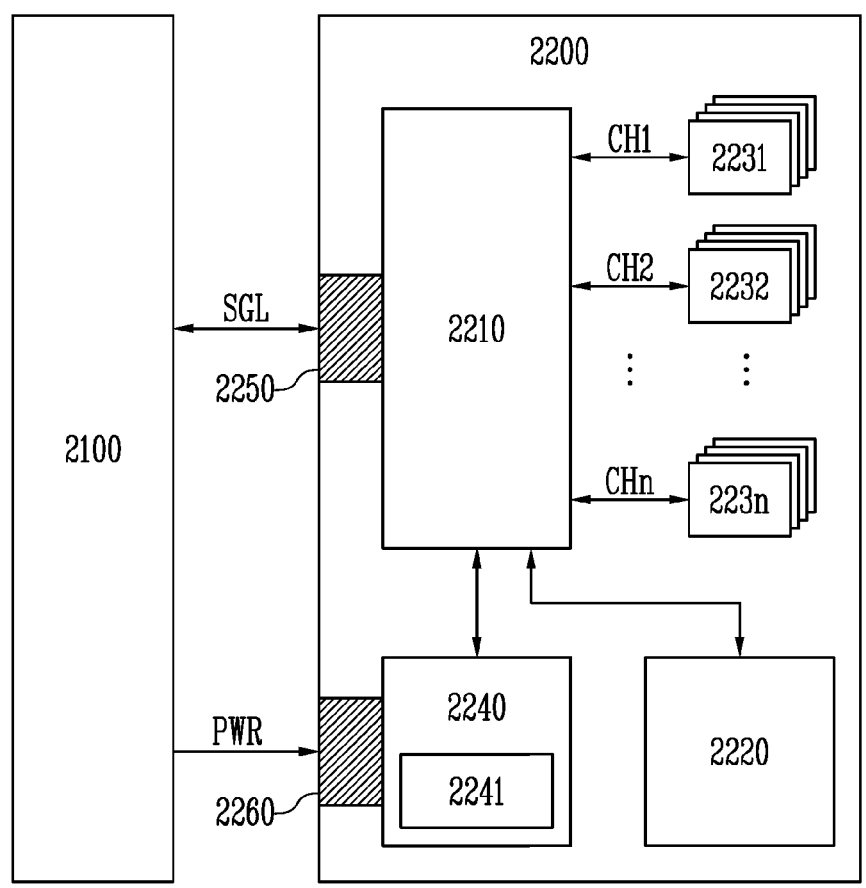
FIG. 7 is a diagram exemplarily illustrating a data processing system including a storage device in accordance with an embodiment of the present disclosure.

FIG. 7 is a diagram illustrating a data processing system including a storage device in accordance with an embodiment of the present disclosure.

Referring to FIG. 7, the data processing system 2000 may include a host device 2100 and a solid state disk or "SSD" 2200.

The SSD 2200 may include a controller 2210, a buffer memory device 2220, non-volatile memories 2231 to 223n, a power supplier 2240, a signal connector 2250, and a power connector 2260.

The buffer memory device 2220 may temporarily store data in nonvolatile memories 2231 to 223n. Also, the buffer memory device 2220 may temporarily store data read from the nonvolatile memories 2231 to 223n. The data temporarily stored in the buffer memory device 2220 may be transmitted to the host device 2100 or the nonvolatile memories 2231 to 223n under the control of the controller 2210.

The nonvolatile memories 2231 to 223n may be used as a storage medium of the SSD 2200. Each of the nonvolatile memories 2231 to 223n may be connected to the controller 2210 through a plurality of channels CH1 to CHn. One or more nonvolatile memories may be connected to one channel. Nonvolatile memories connected to one channel may be connected to the same signal bus and the same data bus.

The controller 2210 may control operation of the SSD 2200. In an embodiment of the present disclosure, the controller 2210 may generate a plurality of compressed-data obtained by encoding and compressing read data. The plurality of generated compressed-data may be stored in the buffer memory device 2220 to be output.

The controller 2210 may generate sub-data groups by dividing data read from the nonvolatile memories 2231 to 223n, and detect bits having a first logic value among bits included in the read data. The controller 2210 may determine target bits of which number is 1 or less per sub-data group among the detected bits, and generate a plurality of compressed-data chunks including position information representing the target bits and sampling data of the target buts. The controller 2210 may store the plurality of compressed-data chunks in the buffer memory device 2220. In the embodiment of the present disclosure, since the maximum number of compressed-data chunks generated per sub-data group is limited, the area of a circuit for generating compressed-data chunks can be minimized.

The power supplier 2240 may provide power PWR input through the power connector 2260 to the inside of the SSD 2200. The power supplier 2240 may include an auxiliary power supplier 2241. The auxiliary power supplier 2241 may provide power such that the SSD 2200 can be normally ended when sudden power-off occurs. The auxiliary power supplier 2241 may include large-capacity capacitors capable of charging the power PWR.

The controller 2210 may exchange a signal SGL with the host device 2100 through the signal connector 2250. The signal SGL may include a command, an address, data, and the like. The signal connector 2250 may be configured as various types of connectors according to an interfacing method between the host device 2100 and the SSD 2200.

In accordance with the present disclosure, there is provided a memory device and a data compression method, in which data is divided and compressed, so that the physical area of a semiconductor substrate, whereby circuitry required to compress data is reduced, thereby enabling the memory device's physical size to be reduced.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and but may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory device comprising:
    a plurality of memory cells;
    a data manager configured to receive data from the plurality of memory cells and generate sub-data groups, each sub-data group being a predetermined number of bits, the number of bits comprising a sub-data group being determined from the number of bits comprising the received data; and
    a data compressor configured to detect first-value bits in the received data, the data compressor being additionally configured to determine a number of target bits in each of the sub-data groups among the first-value bits and generate a plurality of compressed-data chunks, each compressed-data chunk including the target bits and position information representing a position of the target bits in the received data.

2. The memory device of claim 1, wherein the data manager is configured to sequentially generate the sub-data groups, responsive to an ordering of the data received from the plurality of memory cells.

3. The memory device of claim 1, wherein the data manager is configured to size the sub-data groups responsive to a size of data that the data manager receives during one cycle.

4. The memory device of claim 1, wherein the data compressor is configured to determine, as one of the target bits, a first-value bit detected first of all in each of the sub-data groups, the first-value bit being at least one of a logic zero and a logic one.

5. The memory device of claim 4, wherein the data compressor is configured to discard second bits detected after a first-value target bit is detected.

6. The memory device of claim 1, wherein the data compressor is configured to determine a number of the target bits, responsive to a predetermined compression ratio, and configured to select first-value target bits, corresponding to the determined number of target bits.

7. The memory device of claim 6, wherein the data compressor is configured to discard first-value bits which are not selected as a target bit and output the plurality of compressed-data chunks.

8. A storage device comprising:
a memory device configured to:
   divide data read from a plurality of memory cells into sub-data groups;
   detect target groups in the sub-data groups comprising a first-value bit, the first-value bit being a bit having a predetermined first logic value;
   determine target bits in the target groups; and
   generate a plurality of compressed-data chunks, comprising a logic value of target bits and position information, which identifies a position of the target bits in the data read from the plurality of memory cells; and
a memory controller configured to recover the data read from the plurality of memory cells by decoding the plurality of compressed-data chunks received from the memory device.

9. The storage device of claim 8, wherein the memory device is configured to determine a size of the sub-data groups, responsive to a size of data read from the plurality of memory cells during one cycle, and generate the sub-data groups having the same size.

10. The storage device of claim 8, wherein the memory device is configured to determine, as one of the target bits, a first-value bit detected in each sub-data group.

11. The storage device of claim 10, wherein the memory device is configured to discard second bits having the first logic value, which are detected after the detection of a first-value target bit.

12. The storage device of claim 11, wherein the memory controller is configured to recover the discarded second bits by performing an error correction operation on decoded data, the decoding being performed on the plurality of compressed-data chunks.

13. A method of operating a memory device, the method comprising:
   generating sub-data groups having a predetermined size, based on the amount of data received from a plurality of memory cells;
   detecting in the received data, first-value bits having a first logic value;
   determining a number of target bits corresponding to each of the sub-data groups among the first-value bits to become 1 or less per sub-data group; and
   generating a plurality of compressed-data chunks, each compressed-data chunk including a logic value of the target bits and position information representing a position of the target bits in the received data.

14. The method of claim 13, wherein generating sub-data groups comprises sequentially generating the sub-data groups, based on an order in which the data is received from the plurality of memory cells, and
wherein the size of the sub-data groups is determined based on a data amount received during one cycle of the data.

15. The method of claim 13, wherein the determining of the target bit includes determining, as one of the target bits, a first-value bit in each sub-data group.

16. The method of claim 15, wherein the determining of the target bit further includes discarding second bits detected after the first detection of a first-value target bit.

17. The method of claim 13, wherein the determining of the target bit includes:
   determining a number of target bits, based on a predetermined compression ratio; and
   selecting the target bits among the first-value bits, corresponding to the determined number.

18. The method of claim 17, wherein the determining of the target bit further includes:
   discarding first-value bits which are not selected as the target bits; and
   outputting the plurality of compressed-data chunks generated based on the target bits.

* * * * *